United States Patent Office 3,540,873
Patented Nov. 17, 1970

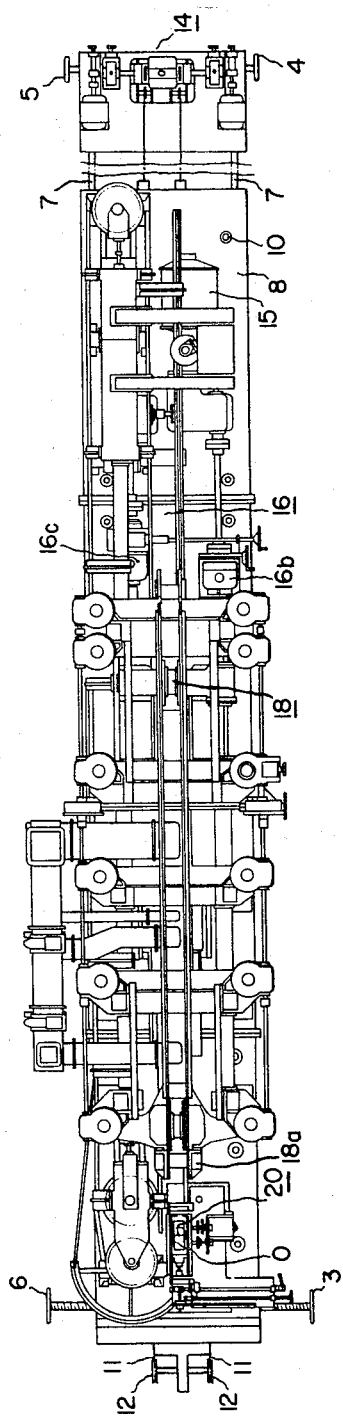
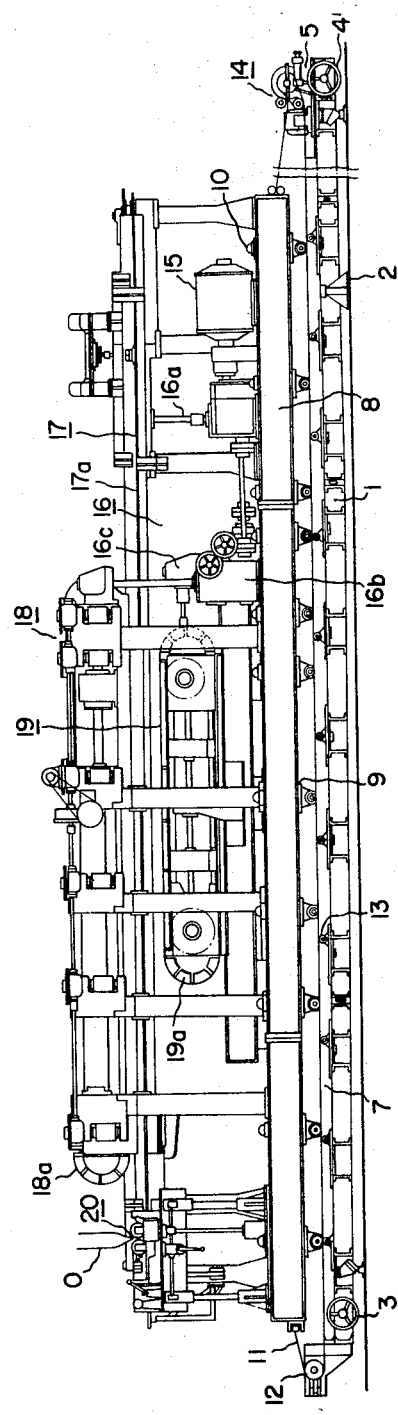

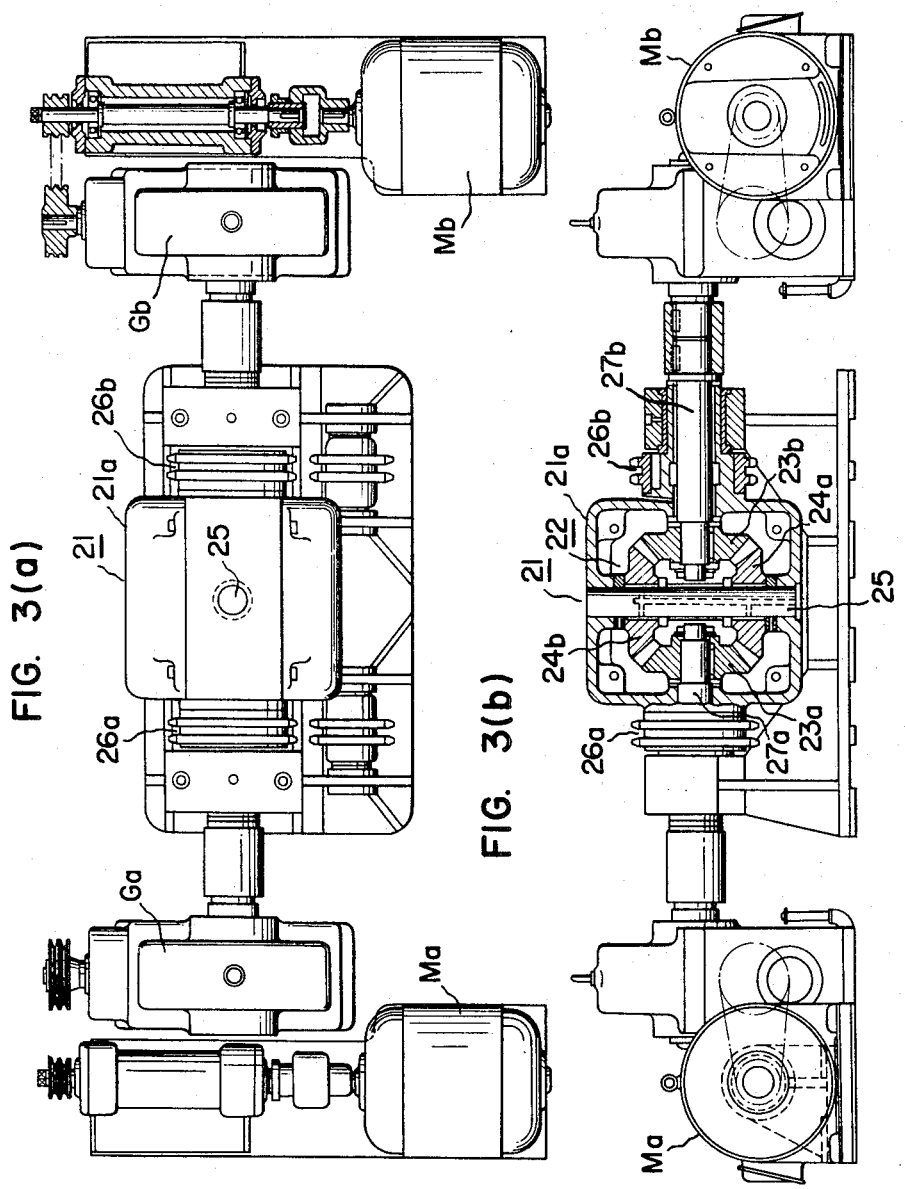

3,540,873
GLASS BULB BLOWING APPARATUS
Takaaki Kurokawa, Chigasaki-shi, and Mitsugu Fukuda, Kawasaki-shi, Japan, assignors to Tokyo Shibaura Denki Kabushiki Kaisha, Kanagawa-ken, Japan, a joint-stock company of Japan
Filed May 16, 1967, Ser. No. 638,901
Claims priority, application Japan, Sept. 10, 1966, 41/59,732
Int. Cl. C03f 5/32
U.S. Cl. 65—184
5 Claims

ABSTRACT OF THE DISCLOSURE

A ribbon bulb-blowing machine is mounted on a base mounted on wheels riding on rails laid on a turn table which is adjustably revolvable about a vertical axis at a remote distance from the ribbon feed rollers of the machine, the wheels being individually adjustable in position relative to the base in directions perpendicular to the rails, and the base being adjustably movable along the rails in two directions at variable speed. Accordingly, the machine can be adjusted accurately in position not only in its longitudinal direction but also in vertical and transverse directions perpendicular to the longitudinal direction with respect to the blowing orifice of a glass melting furnace for supplying glass.

---

This invention relates to glass bulb blowing apparatuses and more particularly to improvements in or relating to such apparatus known as ribbon bulb-blowing machines.

A ribbon bulb-blowing machine or ribbon machine, as is known, is an apparatus for accomplishing the process of pressing flat and rendering into ribbon form molten glass blown downward from an orifice opened at the bottom part of a glass melting furnace, placing this ribbon glass on a plate conveyor undergoing a circulating, endless movement, bringing blow heads and corresponding moulds into contact respectively with opposite surfaces of the ribbon glass while the plate conveyor is undergoing its movement, and blowing bulbs from the ribbon glass.

In order to blow glass bulbs of accurate configuration, that is, glass bulbs without uneven wall thicknesses, by means of a ribbon machine, the following adjustments must be made accurately in the machine.

Since the three components of the glass blowing machine, i.e. the plate conveyor which receive the ribbon glass, the blow heads, and the moulds are attached to respectively separate chain links, the respective pitches of these components must be adjusted to coincide precisely, and, moreover, the unit elements of these three components for each blowing operation must be caused to rendezvous accurately at a specific position.

Furthermore, it is also necessary to align the centre of the gap between the feed rollers which flatten into a ribbon form the glass which is blown from the furnace blowing orifice with the centre of this orifice and, moreover, to align the centreline of the glass ribbon with the centres of the blow heads.

In machines of this character known heretofore, positional adjustments of the machines have been possible only in the longitudinal direction thereof, and positional adjustments perpendicular thereto within horizontal and vertical planes could not be made.

Consequently, in machines of this type known heretofore, positional adjustments of each machine relative to the orifice centre could not be fully accomplished, whereby the quality of the product was impaired in many cases.

It is an object of the present invention to provide a ribbon bulb-blowing apparatus in which positional adjustments of the bulb-blowing machine can be readily made in its longitudinal direction as well as in vertical and horizontal directions perpendicular to the longitudinal direction and thereby to improve the quality of the bulbs produced by the machine.

According to the present invention, briefly summarized, there is provided a glass bulb-blowing apparatus which is characterized by the combination of a turn table which can be adjustably revolved in a horizontal plane about a vertical pivot shaft disposed nearer one longitudinal end of the turn table than the other end, a base structure mounted on a plurality of wheels rollably resting on rails laid on the turn table, a plurality of adjusting devices for adjustably varying the respective individual positions of the wheels in respective planes perpendicular to the rails, a driving device to move the base structure along the rails in either direction at variable speed, and a ribbon bulb-blowing machine mounted on the base structure with an orientation such that the feed rolls for receiving ribbon glass are remotely disposed from the pivot shaft of the turn table.

The nature, principle, and details of the invention will be more clearly apparent from the following detailed description with respect to a preferred embodiment of the invention when read in conjunction with the accompanying drawings, in which like parts are designated by like reference numerals.

In the drawings:

FIG. 1 is a plan view showing the general arrangement of an example of a glass bulb-blowing machine embodying the invention;

FIG. 2 is a side elevational view corresponding orthogonally to FIG. 1; and

FIG. 3(a) is a partial plan view showing a chain driving device constituting a part of the machine shown in FIGS. 1 and 2; and FIG. 3(b) is an elevational view, partly in vertical section and with parts cut away, corresponding orthogonally to FIG. 3(a).

Referring to FIGS. 1 and 2, the bulb-blowing machine illustrated therein is mounted on a turn table 1 which is revolvable in a horizontal plane about a pivot shaft 2 and is positioned and fixed in orientation by fixing devices 3, 4, 5, and 6 respectively disposed in the vicinity of the four corners of the turn table 1 and contacting the side surfaces thereof.

On the turn table 1, there are laid rails 7 on which an apparatus base 8 is placed with a plurality of wheels 9 provided therebelow rollably resting on the rails 7. The vertical position of each wheel 9 relative to the base 8 can be adjustably varied by turning an adjusting screw 10, the details of which are omitted in the illustration. However, for example, said screw 10 may be provided on the protruded head portion of the support of the wheel 9 and screwed in the screw thread hole of the base 8 so as to adjust the vertical position of said support. Of course, a lock nut may be provided on said screw 10. By thus adjusting the vertical positions of the various wheels 9, it is possible to adjust the vertical position and inclination of the base 8 relative to the turn table 1.

The ends of two chains 11 provided respectively on both sides of the base 8 (the chain on only one side being shown in FIG. 2) are fixed to one end (the left-hand end as viewed in FIGS. 1 and 2) of the base 8, and said chains 11 are respectively passed through a chain tensioning device 12 mounted on that end of the turn table 1, over a plurality of guide sprockets 13 disposed in respective rows on the outer sides of the rails 7, to the other end of the turn table 1, where the chains are passed through a chain driving device 14 mounted on that end of the turn table 1 and are finally fixed to the other end (the right-hand end as viewed in FIGS. 1 and 2) of the base 8.

The essential details of the chain driving device 14 are as shown in FIGS. 3(a) and 3(b). This chain driving device 14 is of symmetrical arrangement of parts with respect to the longitudinal axis of the machine and has a horizontal central drum 21 with a hollow middle body 21a containing therewithin a differential bevel gear system 22 which comprises side gears 23a and 23b, differential pinions 24a and 24b meshed with said side gears, and a vertical shaft 25 rotatably supporting the pinions 24a and 24b and fixed to the housing structure of the drum middle body 21a.

The side gears 23a and 23b are coaxially opposed and fixed respectively to horizontal shafts 27a and 27b, which are parallel to the rear end surface of the base 8 and are respectively driven by electric motors Ma and Mb through pulley devices and variable-speed reducers Ga and Gb.

The drum 21 has extensions in the form of hollow shafts extending outwardly from the middle body 21a and respectively supporting chain sprockets 26a and 26b fixed integrally on these hollow shafts, the side gear shafts 27a and 27b being passed concentrically through these hollow shafts. The aforementioned chains 11 are respectively passed over and driven by the sprockets 26a and 26b.

The bulb-blowing apparatus mounted on the base 8 comprises, essentially, an electric motor 15, a power transmitting mechanism 16 comprising a driving gear shaft 16a, a gear box 16b, a gear box 16c, a plate conveyor driving mechanism 17 driven by the motor 15 by way of the shaft 16a of the transmitting mechanism 16 adapted to drive a plate conveyor 17a in circulatory travel within a horizontal plane, a blow head driving mechanism 18 driven through the gear box 16b of the transmitting mechanism 16 and driving a blow head carrying chain 18a having a plurality of blow heads supported thereby at certain intervals and disposed above the path of travel of the plate conveyor, and a mould driving mechanism 19 driven through the gear box 16c of the transmitting mechanism 16 and driving a mould carrying chain 19a having a plurality of moulds supported thereby at certain intervals and disposed below the path of travel of the plate conveyor. In addition, there is provided a pair of feed rollers 20 in a position such that the centre of the gap therebetween coincides substantially with the centre of the path of travel of the plate conveyor.

In the operation of the apparatus of the present invention as described above, the turn table 1 is turned in a horizontal plane about the pivot shaft 2 by adjustment of the fixing devices 3, 4, 5, and 6. A feature of the apparatus of the present invention is that, since the distance between the pivot shaft 2 and the feed rollers 20 is amply long, the movement of the feed rollers 20 due to this turning of the turn table 1 may be considered to be substantially a straight-line movement.

Furthermore, by driving the aforementioned chain 11 by means of the chain driving device 14, the base 8 can be moved on the turn table in the longitudinal direction. As a resulting effect, the feed rollers 20 can be moved in the transverse horizontal direction by turning the turn table 1 and moved in a straight line in the longitudinal direction by means of the chain driving device 14. Therefore, it is possible to make adjustments whereby the feed roller centre and the plate conveyor centre are accurately aligned with the centre of the discharge orifice O at the bottom of a glass melting furnace (not shown).

Another advantageous feature of the present invention, moreover, is that the above mentioned straight-line movement in the longitudinal direction can be obtained at either high or low speed by means of the differential gear system 22 within the middle body 21a of the chain driving device 14.

More specifically, when the motors Ma and Mb are rotated in the same direction at the same rotational speed, the side gears 23a and 23b rotate in the same direction at the same rotational speed, and the sprockets 26a and 26b are driven through the differential pinions 24a and 24b and shaft 25 and are rotated at the rotational speed of the side gears 23a and 23b, whereby the chains 11 are driven at a high speed to move the base 8 at a high speed.

On the other hand, when either of the motors Ma and Mb is rotated at a speed in opposite directions from each other, a differential rotation due to the difference between the rotational speeds of the side gears 23a and 23b is imparted to the differential pinions 24a and 24b and, consequently, to the shaft 25 and the two sprockets 26a and 26b. Accordingly, low-speed movement of the base 8 is obtained.

Thus, in the operation of the apparatus of the present invention, it is possible to obtain movement of the base 8 at a high speed and at a low speed, whereby positional adjustment can be accomplished with rough or coarse adjustment and fine adjustment.

A further feature of the apparatus of the invention is that, in the case when it is necessary to adjust the vertical positions of the various devices mounted on the base 8 relative to a horizontal plane, such positions can be adjusted by independently adjusting the adjusting screw 10 of the wheels 9.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. In a glass bulb-blowing machine of the horizontal type wherein a stream of molten glass is formed into a ribbon by a pair of receiving rolls mounted at one end of the machine beneath a molten glass discharge device and glass bulbs are blown from the glass ribbon during its movement to the other end of the machine, the improvement comprising a pivotally mounted elongated turn table (1) positioned with one end adjacent said discharge device (O); means mounting said turn table for pivotal movement in a horizontal plane about a vertical pivot (2) near the opposite end of said turn table; guide rails (7) mounted on said turn table and extending in a longitudinal direction thereof; a base structure (8) containing thereon the entire glass bulb-blowing machine; a plurality of wheels (9) rotatably mounted on said base structure and rollable along said guide rails; means (3–6) for pivoting said turn table about its pivot (2) in said horizontal plane to move said one end of said turn table laterally with respect to said discharge device; means (11–14) for moving said base structure in either direction longitudinally along said guide rails, and means (10) for raising and lowering said base structure relative to said discharge device, to vary the position of said receiving rolls along three different axes with respect to said discharge device.

2. An improvement according to claim 1, in which said means for moving said base structure longitudinally of said turn table comprises an elongated flexible member (11) having its opposite ends fixed to opposite ends of said base structure and means (14) mounted on said turn table for driving said flexible member selectively in either direction to move said base structure along said rails.

3. An improvement according to claim 2, in which said flexible member comprises chains (11), and said driving means comprises chain sprockets (26a and 26b), drive motor means (Ma, Mb) and gearing (22) connecting said drive motor means with said sprockets to drive said sprockets selectively in opposite directions at selected speed.

4. An improvement according to claim 1, in which said means for pivoting said turn table (1) about said pivot (2) comprises adjusting devices (3, 4, 5, 6) engaging opposite sides of said turn table near the ends thereof.

5. An improvement according to claim 1, in which said means for raising and lowering said base structure (8) comprises adjusting screws (10) for said wheels (9) to adjust the vertical position of said supporting structure (8) relative to said turn table (1).

References Cited

UNITED STATES PATENTS

| | | | |
|---|---|---|---|
| 1,833,284 | 11/1931 | Gray | 65—184 XR |
| 1,943,195 | 1/1934 | Van Ness | 65—184 |
| 2,045,716 | 6/1936 | McCauley | 65—258 XR |
| 3,231,356 | 11/1966 | Giffen | 65—184 |
| 3,347,652 | 10/1967 | Giffen | 65—184 XR |

FOREIGN PATENTS

38/5,139  4/1963  Japan.

FRANK W. MIGA, Primary Examiner

U.S. Cl. X.R.

65—258, 261, 361